(12) United States Patent
Mansouri Rad et al.

(10) Patent No.: US 12,174,468 B2
(45) Date of Patent: Dec. 24, 2024

(54) METHOD, APPARATUS AND SYSTEM FOR LIMITED-RANGE IMPEDANCE TUNING FOR SILICON PHOTONICS DEVICES

(71) Applicant: HUAWEI TECHNOLOGIES CO., LTD., Shenzhen (CN)

(72) Inventors: Mohammad Mehdi Mansouri Rad, Kanata (CA); Eric Bernier, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 251 days.

(21) Appl. No.: 17/575,796

(22) Filed: Jan. 14, 2022

(65) Prior Publication Data
US 2023/0229026 A1 Jul. 20, 2023

(51) Int. Cl.
*G02F 1/01* (2006.01)
*G02F 1/21* (2006.01)

(52) U.S. Cl.
CPC ............ *G02F 1/0121* (2013.01); *G02F 1/212* (2021.01)

(58) Field of Classification Search
CPC ................ G02F 1/0121; G02F 1/212
See application file for complete search history.

(56) References Cited

U.S. PATENT DOCUMENTS

| | | | | |
|---|---|---|---|---|
| 5,656,952 A | * | 8/1997 | McCall | H03K 19/018528 326/82 |
| 6,060,905 A | * | 5/2000 | Bickford | H03K 19/018585 326/86 |
| 6,868,262 B2 | * | 3/2005 | Gonya, Sr. | H03H 11/245 330/254 |
| 6,983,432 B2 | * | 1/2006 | Hayes | G06F 30/367 703/2 |
| 7,902,860 B2 | * | 3/2011 | Yamamoto | H03F 3/3028 333/17.3 |

(Continued)

FOREIGN PATENT DOCUMENTS

| | | | | |
|---|---|---|---|---|
| CN | 110224759 A | * | 9/2019 | ........... H04B 10/501 |
| CN | 110311735 A | | 10/2019 | |

(Continued)

OTHER PUBLICATIONS

English language translation of CN-110224759-A (Year: 2019).*
Choi et al., An Output-Bandwidth-Optimized 200Gb/s PAM-4 100Gb/s NRZ Transmitter with 5-Tap FFE in 28nm CMOS, 2021 IEEE International Solid-State Circuits Conference (ISSCC), San Francisco, CA, USA, 2021, pp. 128-130, doi: 10.1109/ISSCC42613.2021.9366012 (Year: 2021).*

(Continued)

*Primary Examiner* — Peter Radkowski (57) ABSTRACT

There is provided an optical communication device having a silicon photonics (SiPh) component configured to perform an optical communication function; a complementary metal oxide semiconductor (CMOS) drive circuit coupled to the SiPh device for operation thereof; and one or more controllably adjustable CMOS impedance circuits coupled to the SiPh component and the electrical drive circuit. In the optical communication device, impedances of each of the CMOS impedance circuits can be adjustable over a respective limited range. The limited range may be designed and configured based at least in part on an anticipated amount of variation in electrical characteristics of the SiPh component, the CMOS electrical drive circuit, or a combination thereof. Such variation may be anticipated due to manufacturing variability.

20 Claims, 8 Drawing Sheets

(56) References Cited

U.S. PATENT DOCUMENTS

| | | | |
|---|---|---|---|
| 8,530,821 B2* | 9/2013 | Green | G02F 1/025 250/227.12 |
| 8,592,743 B2* | 11/2013 | Green | G02F 1/025 250/227.12 |
| 8,704,566 B2* | 4/2014 | Ainspan | H03L 7/093 327/158 |
| 8,704,567 B2* | 4/2014 | Ainspan | H03L 7/087 327/158 |
| 9,097,769 B2* | 8/2015 | Schillak | G01R 33/54 |
| 10,627,463 B2* | 4/2020 | Schillak | G01R 33/3621 |
| 11,368,143 B1* | 6/2022 | Chakraborty | G06F 1/08 |
| 11,496,164 B2* | 11/2022 | Chakraborty | H04B 1/0082 |
| 11,569,913 B2 | 1/2023 | Bernier et al. | |
| 11,621,730 B2* | 4/2023 | Chakraborty | H04B 1/0032 375/295 |
| 11,683,026 B1* | 6/2023 | Chakraborty | G06N 10/40 327/527 |
| 11,777,496 B1* | 10/2023 | Chakraborty | G06N 10/40 327/291 |
| 11,888,445 B2* | 1/2024 | Plouchart | H03L 7/099 |
| 2003/0045258 A1* | 3/2003 | Gonya, Sr. | H03H 11/245 455/252.1 |
| 2008/0180340 A1* | 7/2008 | Hobbs | G02B 6/107 356/477 |
| 2009/0085688 A1* | 4/2009 | Yamamoto | H03K 19/017581 333/17.3 |
| 2011/0298561 A1* | 12/2011 | Green | G02F 1/0121 333/236 |
| 2012/0223709 A1* | 9/2012 | Schillak | G01R 33/3621 324/309 |
| 2012/0319805 A1* | 12/2012 | Green | G02F 1/0121 333/260 |
| 2014/0070855 A1* | 3/2014 | Ainspan | H03L 7/1072 327/145 |
| 2014/0070856 A1* | 3/2014 | Ainspan | H03L 7/1072 327/145 |
| 2015/0338478 A1* | 11/2015 | Schillak | G01R 33/3607 324/309 |
| 2020/0174514 A1 | 6/2020 | Amiralizadeh Asl et al. | |
| 2020/0371385 A1 | 11/2020 | Amiralizadeh Asl et al. | |

FOREIGN PATENT DOCUMENTS

| | | | | |
|---|---|---|---|---|
| JP | 2015192268 A | * | 11/2015 | H03F 1/3211 |
| WO | WO-2015146247 A1 | * | 10/2015 | H03F 1/3211 |

OTHER PUBLICATIONS

Menolfi et al., A 112Gb/S 2.6pJ/b 8-Tap FFE PAM-4 SST TX in 14nm CMOS, 2018 IEEE International Solid-State Circuits Conference—(ISSCC), San Francisco, CA, USA, 2018, pp. 104-106, doi: 10.1109/ISSCC.2018.8310205 (Year: 2018).*

Xiong et al., Monolithic 56 GB/s silicon photonic pulse-amplitude modulation transmitter, Optica 3, 1060-1065 (2016) (Year: 2016).*

Sentieri et al., 12.2 A 4-Channel 200Gb/s PAM-4 BiCMOS Transceiver with Silicon Photonics Front-Ends for Gigabit Ethernet Applications, 2020 IEEE International Solid-State Circuits Conference—(ISSCC), San Francisco, CA, USA, 2020, pp. 210-212, doi: 10.1109/ISSCC19947.2020.9062992 (Year: 2020).*

Y. Yun, et al., "Variable Inductors in CMOS for Millimeter-Wave Applications," IEEE Electron Device Letters, vol. 33, No. 7, Jul. 2012.

M. Kumngem, "CMOS Tunable Positive/Negative Floating Resistor Using OTAs," 2012 Fourth International Conference on Computational Intelligence, Communication Systems and Networks.

C. A. Thraskias, et al., "Survey of Photonic and Plasmonic Interconnect Technologies for Intra-Datacenter and High-Performance Computing Communications," IEEE Communications Surveys and Tutorials, vol. 20, No. 4, pp. 2757-2783, Fourth Quarter 2018.

C. Sun, et al., "A 45 nm CMOS-SOI Monolithic Photonics Platform With Bit-Statistics-Based Resonant Microring Thermal Tuning," IEEE Journals of Solid-State Circuits, vol. 51, No. 4, pp. 983-907, Apr. 2016.

Shi et al. Nanophotonics 2020, 9(16): 4629-4663.

Yu et al. Journal of Lightwave Technology 30(11). Jun. 1, 2012.

Samani et al. Optics Express 25(11) May 29, 2017.

Samani et al. Journal of Lightwave Technology 37(13) Jul. 1, 2019.

Zhou et al. Journal of Lightwave Technology 39(4), Feb. 15, 2021.

Kim, M. et al. Journal of Lightwave Technology 37(4) 2019.

Xuezhe Zheng et al. Optics Express 2014 A high-speed, tunable silicon photonic ring modulator integrated with ultra-efficient active wavelength control. 22(10): 12628-12633.

C. Popa paper "Low-Area Tunable CMOS Resistor with Improved Linearity" ICECS 2010.

D. Ma et al paper "A Tunable CMOS Resistor with Wide Tuning Range for Low Pass Filter Application," in 2009 IEEE Topical Meeting on Silicon Monolithic Integrated Circuits in RF Systems.

Li et al. Journal of Lightwave Technology, vol. 38, No. 1, Jan. 1, 2020.

Dong et al. Optics eXpress 2017 Simultaneous Wavelength Locking of Microring Modulator Array with a Single Monitoring Signal 25(14):16040-16046.

* cited by examiner

METHOD, APPARATUS AND SYSTEM FOR LIMITED-RANGE IMPEDANCE TUNING FOR SILICON PHOTONICS DEVICES

CROSS-REFERENCE TO RELATED APPLICATIONS

This is the first application filed for the present invention.

FIELD OF THE INVENTION

The present invention pertains to the field of Silicon Photonics and in particular to a method, apparatus and system for tuning, within a limited range, the impedances related to driving a silicon photonics device for example by co-located complementary metal oxide semiconductor (CMOS) circuitry.

BACKGROUND

Large scale data centers (DC) and high performance computing (HPC) systems require high computing power at high energy efficiency. The large amounts of power consumed by such operations are a concern as well as a determining factor for the next generation of interconnect technologies which communicatively couple components in DCs, HPC systems, and other devices. As a result, the energy per bit of an interconnect (communication) device is a key indicator of its feasibility and qualifications for such applications. Optical interconnect technologies can communicate at data rates of hundreds of Gigabits per second (Gbps), and plans are to increase these data rates in future. As such, various schemes and architectures have been proposed to achieve target data rates, while satisfying energy per bit and cost requirements, with the focus on providing high density, small footprint, and low power consumption as well as support for scalability. In particular, the energy per bit of an interconnect module, expressed in Joules per bit (J/b) can be a key metric. Such technologies are needed to support operations under un-cooled environments (typically from 20° C. to 70° C. temperature changes), which makes achieving the reliability, power consumption and footprint targets challenging.

Various technologies and architectures have been proposed for such optical interconnects, including Mach-Zehnder Interferometer (MZI) based modulators, vertical cavity surface emitting laser modulators (VECSEL), electro-absorption modulators (EAM), etc. While various technologies and platforms such as gallium arsenide (GaAs), indium phosphide (InP), silicon nitride (SiN), and lithium niobate (LiNO$_3$) have been widely and successfully commercialized, research and focus on silicon photonics (SiPh) has gained significant attention over the past decade, and especially in the past few years. It is believed that the process compatibility of SiPh with complementary metal-oxide semiconductor (CMOS) facilitates a significantly large cost reduction and performance improvement capabilities through monolithic integration.

SiPh based interconnects have been successfully built and commercialized. The compatibility of SiPh with CMOS is an attractive aspect potentially leading to widespread use. However, SiPh can be an inefficient media for electro-optical modulation and hence less efficient modulators are typically achieved using SiPh, when compared to other alternatives. Such drawbacks can be at least partially counteracted for example by applying stronger electrical drive signals, more sophisticated digital signal processing (DSP), or strong biasing and swing for operating points of the device.

SiPh also has a limit on its supported electro-optic (EO) bandwidth. This theoretical limit has been investigated by mathematical models and simulations and is shown to be around 100 GHz for practical purposes. This limit directly impacts the feasible sampling rate (or baud rate) of devices operating based on SiPh. In particular, sampling rates beyond about 150 Gigasamples (GS) don't currently seem feasible using existing SiPh capabilities. Currently, most transceivers operate with about 30-50 GHz of bandwidth and hence this theoretical limit may be approached within a few years where the importance of other schemes such as hybrid, serial, and or parallel configuration arrangements of a SiPh junction may be of high interest.

SiPh based device performance is significantly process dependent. Target performance may be achievable only when devices are fabricated to very closely match design specifications. Unfortunately, design or manufacturing process variations can significantly impact the operating performance. SiPh ring modulators are an example of such a process-dependent component, and such SiPh ring modulators are sensitive to manufacturing (fabrication) variation and uncertainty. In particular, fabrication uncertainty in the primary resonance of the ring may be directly translated into significant power consumption and transceiver efficiency (Joules/bit) degradation. Process fabrication is known to exhibit uncertainty for example in terms of doping variation (relevant for PN-junction of a SiPh device) and sheet resistance (relevant for electrodes, pads, transmission lines, etc.). Therefore while design efforts may produce a device design with adequate performance, such performance is not guaranteed for the final fabricated device. Such problems can be exacerbated when the device is packaged and assembled in a final "product" format, making it deviate even more from the original design specifications.

To mitigate such problems, the design process can follow an iterative design-verification process to make sure that all aspects and uncertainties are assessed and addressed as much as possible before volume production. As much as this approach is followed, there will always be some unknowns, collectively and individually. Devices typically suffer from a fabrication tolerance and such effects may vary device by device on the same wafer and also from wafer to wafer.

Therefore there is a need for a method, apparatus and system for handling SiPh device variations that is not subject to one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present disclosure is to provide a method, apparatus and system for limited-range impedance tuning for silicon photonics devices, particularly communication devices such as transceivers.

In accordance with embodiments of the present disclosure, there is provided an optical communication device having a silicon photonics (SiPh) component configured to perform an optical communication function; a complementary metal oxide semiconductor (CMOS) electrical drive circuit operatively coupled to the SiPh device for operation thereof; and one or more controllably adjustable CMOS impedance circuits operatively coupled to the SiPh component and the electrical drive circuit.

In accordance with embodiments of the present disclosure, there is provided an apparatus having one or more controllably adjustable CMOS impedance circuits. The impedance circuits are operatively coupled to one or both of: a SiPh component of an optical communication device; and a CMOS electrical drive circuit of the optical communication device. The SiPh component is configured to perform an optical communication function, the electrical drive circuit operatively coupled to the SiPh device for operation thereof.

In accordance with embodiments of the present disclosure, there is provided a method comprising: by a controller, adjusting one or more CMOS impedance circuits. The impedance circuits are operatively coupled to one or both of: a SiPh component of an optical communication device; and a CMOS electrical drive circuit of the optical communication device. The SiPh component is configured to perform an optical communication function, the electrical drive circuit operatively coupled to the SiPh device for operation thereof.

In some embodiments, each of the one or more CMOS impedance circuits has an impedance which is adjustable over a respective limited range. The limited range is designed and configured based at least in part on an anticipated amount of variation in electrical characteristics of the SiPh component, the CMOS electrical drive circuit, or a combination thereof, said variation due to manufacturing variability.

In some embodiments, a controller adjusts the one or more CMOS impedance circuits based on one or more measurements indicative of optical communication performance. The measurements may be are indicative of one or more of: bandwidth; bit error rate; optical modulation amplitude; error vector magnitude; etc. The controller may be configured to iteratively search for an adequate operating condition of the optical communication device by repeatedly taking said measurements and adjusting the one or more CMOS impedance circuits based on said measurements. The measurements may be obtained by local monitoring of an output of the optical communication device. In this regard, an optical switch may direct output of the optical communication device to the controller to facilitate loopback self testing. The controller may be configured to adjust the one or more CMOS impedance circuits in response to an indication that an improved optical communication performance is required.

In some embodiments, the one or more CMOS impedance circuits comprise a plurality of CMOS impedance circuits which are adjustable individually or collectively.

In some embodiments, at least one of the one or more controllably adjustable CMOS impedance circuits is located, within an electrical circuit comprising the electrical drive circuit and the SiPh component, at one of: a pre-compensation location in between an output of the electrical drive circuit and an electrical drive input of the SiPh component; a termination location following the SiPh component such that the SiPh component is electrically between the electrical drive circuit and the termination location; and an intermediate location of the SiPh component between the electrical drive input of the SiPh component and the termination location.

In some embodiments, at least one of the one or more controllably adjustable CMOS impedance circuits is located within an optical modulator driver of the optical communication device or a CMOS portion of an optical modulator of the optical communication device.

In some embodiments, the SiPh component, the electrical drive circuit, and the one or more CMOS impedance circuits are all integrated in a same chip.

In some embodiments, the SiPh component is a traveling wave Mach-Zehnder interference modulator. Alternatively, the SiPh component can be another device such as a ring resonator based modulator (e.g. microring resonator), or a micro-disc based modulator.

In some embodiments, each of the one or more controllably adjustable CMOS impedance circuits has an adjustable impedance which is one or a combination of: an inductance, a capacitance, and a resistance.

Embodiments of the present disclosure provide adjustable electrical impedance components associated with the circuitry used for operation of a silicon photonics device such as a transceiver. The circuitry can be partially or fully provided using CMOS technology. The silicon photonics device and the circuitry can be co-located, for example integrated on a same single chip or at least co-packaged.

Embodiments of the present disclosure provide for a controller and associated method for adjusting the impedance of the adjustable electrical impedance components. The adjustment can be based on feedback indicative of one or more performance indicators such as bandwidth, bit error rate, optical modulation amplitude, error vector magnitude, etc.

Embodiments of the present disclosure provide tunability within a limited range. In particular, adjustable impedance components are adjustable substantially only over a required range and not further than the require range. The use of a limited range allows the impedances to be adjusted appropriately while avoiding unnecessary cost and complexity associated with an adjustable impedance component which is adjustable over a larger range than necessary. The range can be configured based on operating requirements, performance vs. impedance analysis, anticipated manufacturing variation, etc. Also, by providing for a limited range for tunability, potentially finer impedance control within this range may be achieved. Fine impedance control can be important for example when performance is highly sensitive to the controlled impedance.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

The present disclosure provides a method, apparatus and system to address and compensate for variations in performance of a CMOS-SiPh transceiver, resulting from manufacturing process and uncertainty. By integrating tunability on one or more circuits of a CMOS-SiPh transceiver, variations in performance can be mitigated by appropriately tuning the one or more circuits. Device performance as designed and expected can therefore be more adequately achieved despite manufacturing variance (also referred to as errors).

It is an object of embodiments to increase the likelihood that a CMOS-SiPh transceiver device is capable of meeting optimal performance or performance as designed.

The bandwidth of a CMOS-SiPh transceiver is a feature that is subject to manufacturing uncertainty and that can be compensated for with embodiments of the present disclosure. However, embodiments can include communication devices other than a CMOS-SiPh transceiver, such as any optical communication device comprising a SiPh component configured to perform an optical communication function; a CMOS electrical drive circuit operatively coupled to the SiPh device for operation thereof; and one or more controllably adjustable CMOS impedance circuits, operatively coupled to the SiPh component and the electrical drive circuit.

It is recognized herein that ensuring that manufactured devices are actually meeting their optimal achievable performance is important. Knowing the limits in bandwidth of SiPh based modules also makes the uncertainty in design, fabrication, and assembly important. Analog bandwidth is limited, and hence making sure devices match the design specifications as closely as possible is desirable. It is also desirable to avoid performance degradation because of manufacturing imperfections. Thus, embodiments of the present disclosure focus on electro-optics behaviors of the SiPh device.

In embodiments, each of the one or more CMOS impedance circuits can have an impedance which is adjustable over a respective limited range. The limited range may be designed and configured based at least in part on an anticipated amount of variation in electrical characteristics of the SiPh component, the CMOS electrical drive circuit, or a combination thereof. The variation may be due to manufacturing variability. The use of a limited range which covers only the necessary variability allows for adequate tunability (adjustability) while limiting tunable circuit complexity.

In an embodiment, a CMOS electrical drive circuit can be characterized by a source swing voltage ($V_s$) and an impedance ($Z_s$). A SiPh component can be a traveling wave Mach-Zehnder interferometer-based modulator (MZM) having an impedance $Z_0$. More generally, a SiPh component can be an electrically controllable device which produces or manipulates an optical signal (thus performing an optical communication function) in response to such electrical control, and which is provided using SiPh fabrication techniques and materials. A controllably adjustable CMOS termination circuit can have an impedance $Z_L$. A CMOS-SiPh transceiver can be designed to have a known impedance, such as 50 Ohms. The impedance can have a different target value depending on an overall co-optimization of the CMOS and SiPh components (e.g. 30 Ohms in some cases). The end-to-end performance of a CMOS-SiPh transceiver can be affected by each component, such as a CMOS electrical drive circuit, a MZM, and a controllably adjustable CMOS termination circuit and therefore each one can be used to target an overall system behavior.

Figure 1:
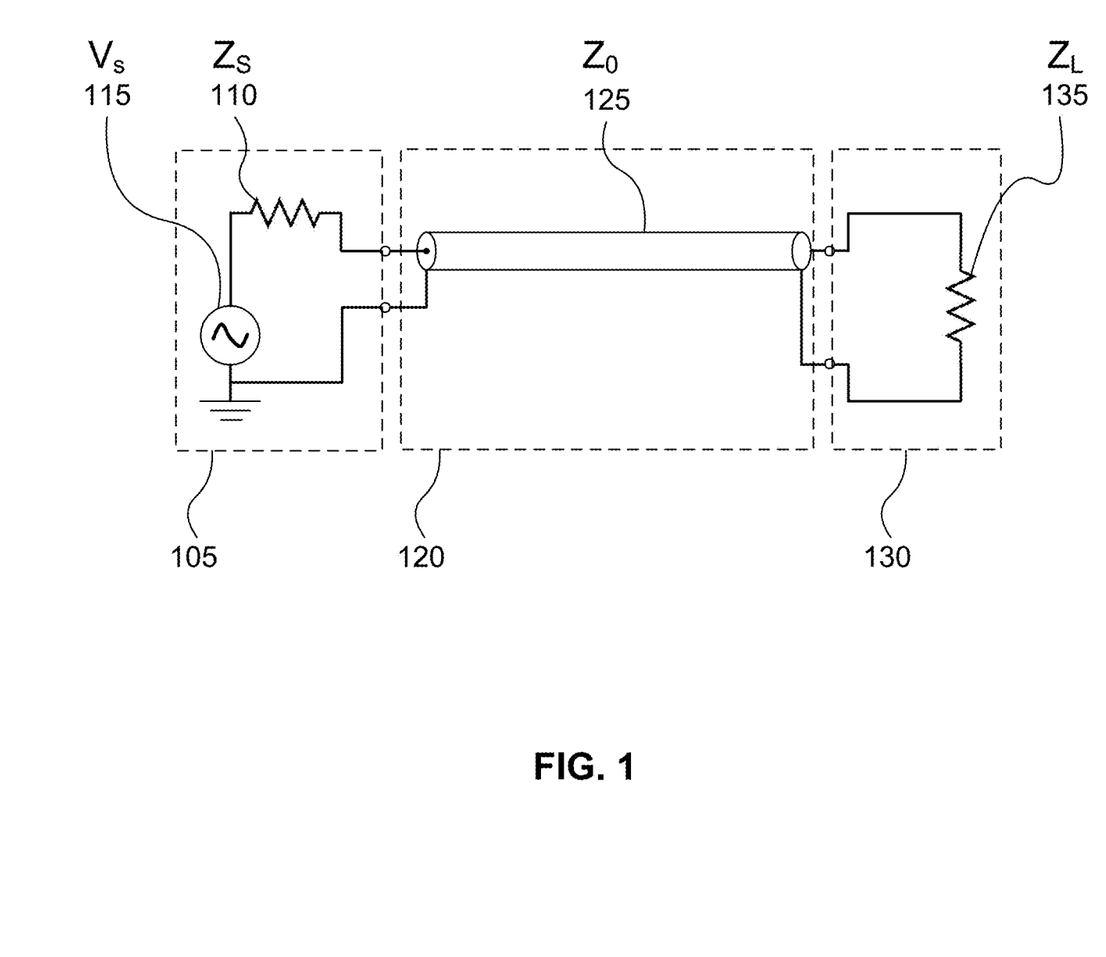
FIG. 1 illustrates a transceiver made from an electro-optic integration of CMOS and Si-Photonics, according to an embodiment.

FIG. 1 illustrates a transceiver made from an electro-optic integration of CMOS and SiPh (CMOS-SiPh transceiver), according to an embodiment. A CMOS electrical drive circuit 105 has source swing impedance $Z_s$ 110, and provides a source swing voltage $V_s$ 115. A MZM 120 (modelled as a transmission line) has an impedance $Z_0$ 125 and is terminated with a termination circuit 130 having further impedance $Z_L$ 135. More specifically, the travelling wave electrode of a travelling wave (TW) MZM, which is operatively coupled to control circuitry, is readily modelled as a transmission line. The three impedances, as designed, can be nominally equal $Z_s = Z_0 = Z_L$, and can target a known value such as 50 Ohms, or they can have a different target value, depending on an overall co-optimization of CMOS and SiPh, such as 30 Ohms. An end-to-end performance depends on each component, the driver 115, the MZM 120, and the termination 130, following its expected target behavior, otherwise significant performance degradations can be, and generally will be, experienced.

During an assembly or fabrication process of a CMOS-SiPh transceiver, unexpected variations from a design can occur. In particular, components can have impedances that deviate from designed impedances. This can be due to manufacturing equipment precision limitations, substrate impurities or variations in composition, etc. However, in accordance with an embodiment, one or more tuning elements, in the form of finely tunable impedance circuits, can be added to such transceiver, in order to perform fine tuning of circuit characteristics. The tuning elements can be used to compensate for undesired variations of instances of a device from its design specifications. The tuning elements may be tunable, with respect to their impedance, over a significantly limited range. Tuning capabilities can be based on inductor elements, for example. In an embodiment, an adjustable impedance of a controllably adjustable CMOS impedance circuits according to embodiments can be achieved with a combination of: an inductance, a capacitance, and a resistance.

Figure 2:
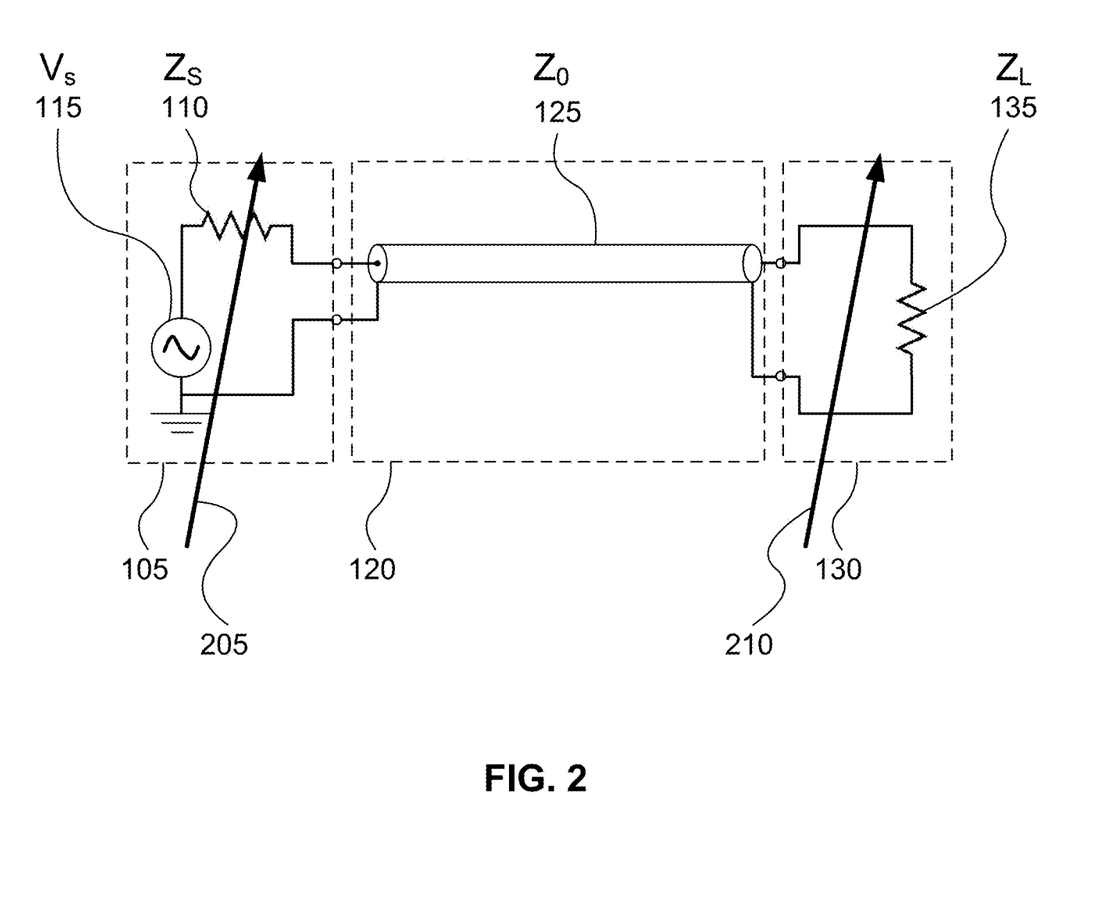
FIG. 2 illustrates a transceiver made from an electro-optic integration of CMOS and Si-Photonics, in which tunable circuits are added to allow pre- and post-circuit fine-tuning capability, according to an embodiment.

FIG. 2 illustrates a CMOS-SiPh transceiver, in which tunable circuits are added to allow pre-circuit and post-circuit fine-tuning capability, according to an embodiment.

A pre-circuit fine-tuning capability 205 can be added to the driver 115, and a post-circuit fine-tuning capability 220 can be added to the termination 130. Thus, an adjustable CMOS impedance circuit can be located within an optical modulator driver, a CMOS portion of an optical modulator (e.g. TW-MZM), or a combination thereof.

Moreover, it is considered that one or more adjustable CMOS impedance circuits can be located at one or more of a variety of locations within the optical communication device, in order to provide for improved impedance matching and thus improved performance. Adjustable CMOS impedance circuit can be provided within an electrical circuit which includes the electrical drive circuit and the SiPh component.

At least one of these adjustable impedance circuits can be located at a pre-compensation location (e.g. at location 110) which is in between (i.e. in series between) an output of the electrical drive circuit and an electrical drive input of the SiPh component, which is driven by the drive circuit.

At least one of these adjustable impedance circuits can be located at a termination location (e.g. at location 135) following the SiPh component, such that the SiPh component is electrically between the electrical drive circuit and the termination location. The circuit at the termination location can be loaded to the end of the component (e.g. TW-MZM) which is modeled as a transmission line, if applicable. This circuit (and others) can be on chip or off chip depending on the design, and may potentially be provided using wire bonding or flip chip approaches.

At least one of these adjustable impedance circuits can be located at an intermediate location of the SiPh component (e.g. at location 125) between the electrical drive input of the SiPh component and the termination location. Such circuits can be designed to be added to the RF transmission line. Alternatively, the SiPh component may include multiple segments of PN junctions (e.g. multiple phase shifters). This may be the case for example when the SiPh component is a segmented MZM. In such cases, each of one or more adjustable impedance circuits can be placed in between a different respective pair of segments of the transmission line.

Figure 3A:
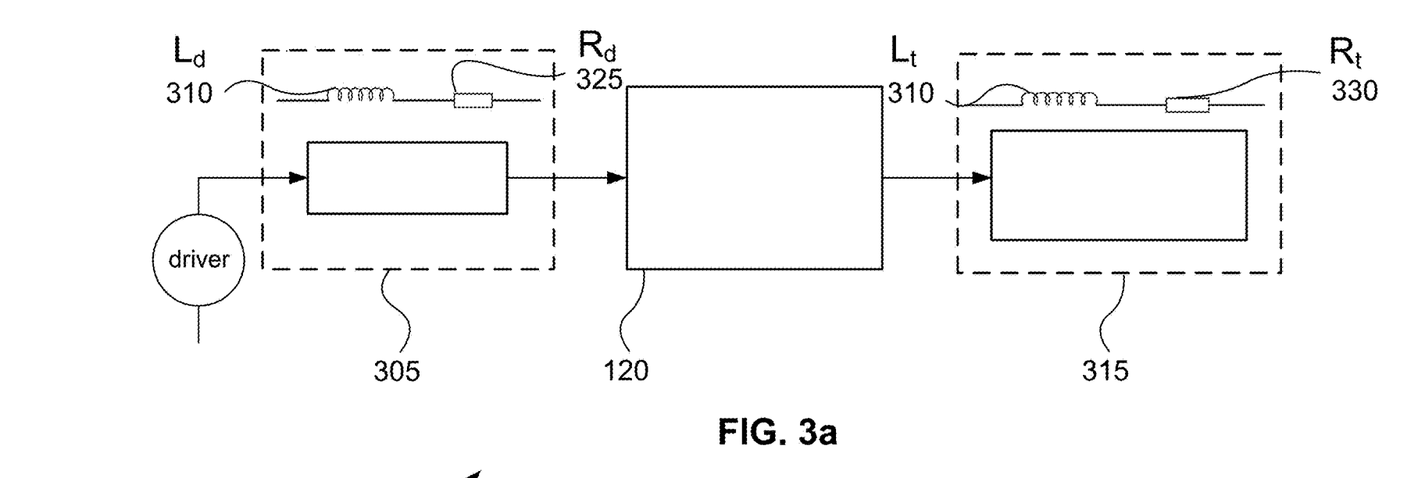
FIG. 3a illustrates a CMOS-SiPh transceiver in which a tunable circuit further includes an inductor, according to an embodiment.

FIG. 3a illustrates a CMOS-SiPh transceiver in which a tunable circuit also includes an inductor, according to an embodiment. In order to provide for more tunability in a pre-circuit and a post-circuit, a CMOS electrical drive circuit 305 can further include a first inductor $L_d$ 310, and a termination circuit 315 can include a second inductor $L_t$ 315, which can have a similar or different inductance than the first inductor. A CMOS electrical drive circuit 305 can also include a first resistor $R_d$ 325, and a termination circuit 315 can also include a second resistor $R_t$ 330, which can have a similar or different inductance than the first resistor.

Figure 3B:
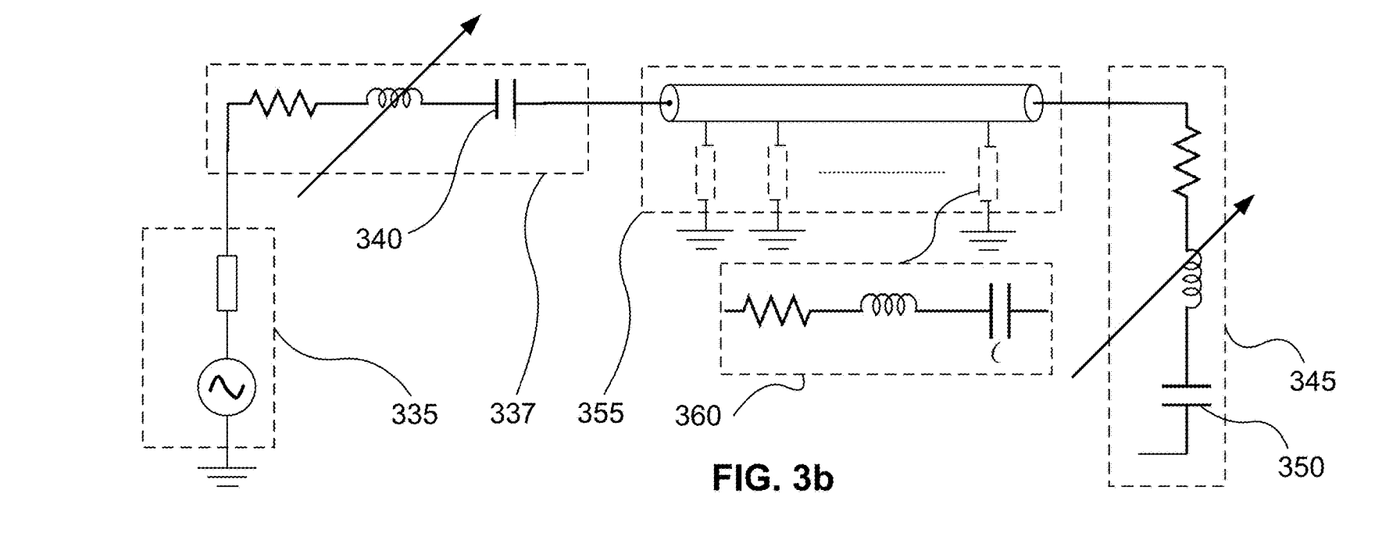
FIG. 3b illustrates a CMOS-SiPh transceiver in which a tunable circuit further includes a capacitor, according to embodiments.

FIG. 3b illustrates a CMOS-SiPh transceiver in which a tunable circuit further includes a capacitor, according to embodiments. In order to provide for more tunability in a pre-circuit and a post-circuit, a CMOS electrical drive circuit 335 can further include, as a part of an intermediate circuit 337 a first capacitor $C_d$ 340 and a termination circuit 345 can further include a second capacitor $C_t$ 350, which can have a similar or different capacitance as the first capacitor 340. A central SiPh component 355, which can be a traveling wave Mach-Zehnder interference modulator (MZM), can be complemented with further sub-circuits 360, each of which can include any of a resistor, an inductor and a capacitor, each of which adjustable towards a final optimal specification of the CMOS-SiPh transceiver. The tuning range for any of the tuning elements can depend on expected fabrication uncertainties.

In general, a tunable circuit can be in series or parallel with other transceiver components. The transceiver components and tunable circuits can be arranged in a combination of series and parallel configurations. Furthermore, the tunable circuit can include components which provide a controllable resistance, controllable capacitance, controllable inductance, or combination thereof. When multiple such components are provided, these components can be arranged in series, parallel, or a combination thereof (e.g. a series-parallel network). Components can behave as lumped elements or distributed elements, or a combination thereof.

The scattering coefficients characteristic of a CMOS-SiPh transceiver according to embodiments can be measured or calculated as a function of frequency and the effect of including controllably adjustable impedance to a CMOS electrical drive circuit (pre-circuit) and a controllably adjustable impedance to a termination circuit (post-circuit) can be observed.

Figure 4:
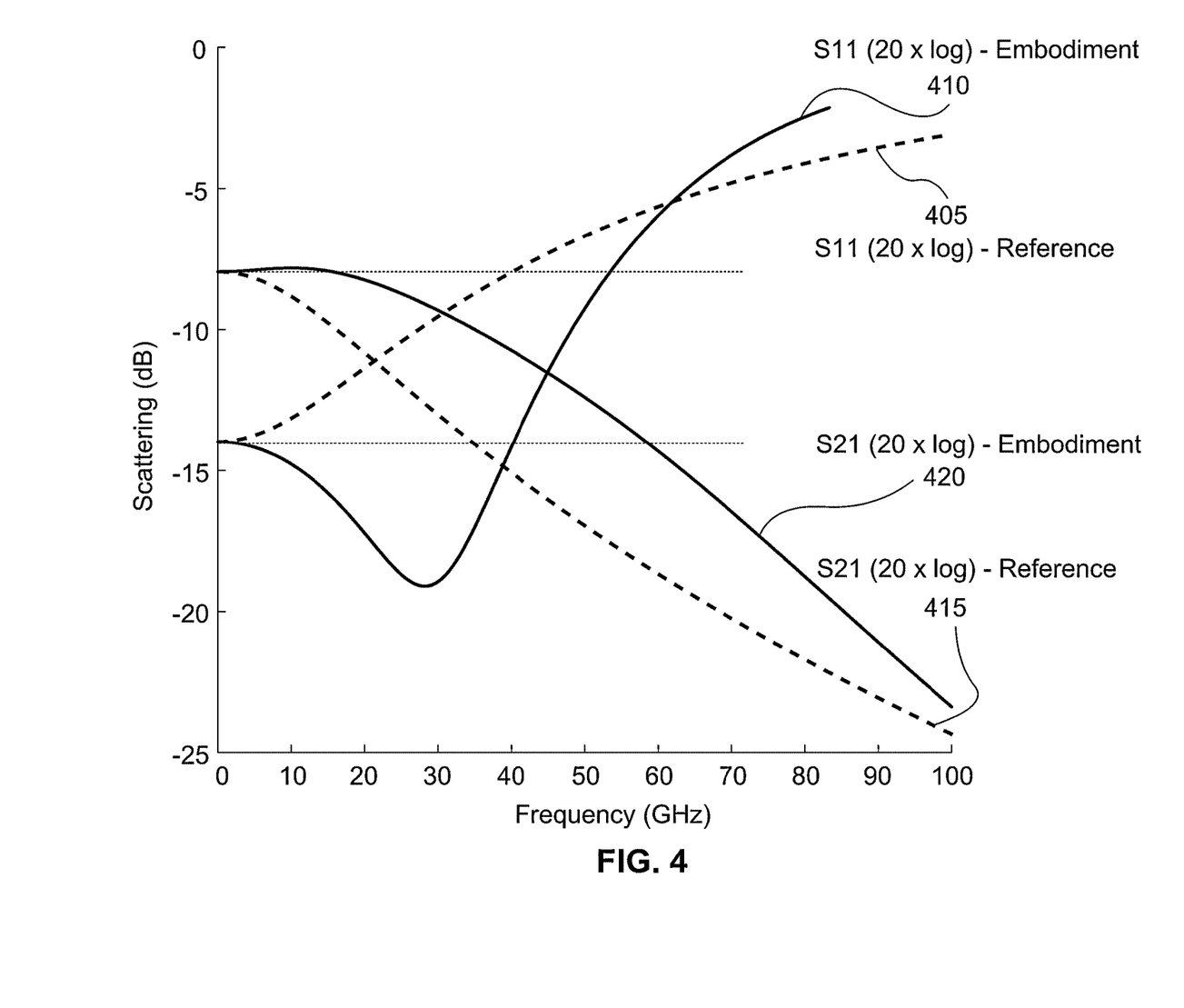
FIG. 4 is a graph showing scattering as a function of frequency, for a circuit with pre- and post-circuit fine-tuning capabilities, according to an embodiment.

FIG. 4 is a graph showing scattering coefficients S11 and S21 of a CMOS-SiPh transceiver, as a function of frequency, for a circuit with pre-circuit and post-circuit fine-tuning capability, according to an embodiment. The S11 coefficient indicates the amount of reflected signal in the transceiver circuit, while the S12 coefficient indicates the amount of transmitted signal in the transceiver circuit. As a reference, scattering parameters S11 and S21 as a function of frequency are shown for a conventional circuit, characterized by an equivalent pn-junction with 75 fF, 100 Ohm with 75 fF pad, with a first dotted curve 405. By adding to such circuit a pre-circuit fine-tuning capability based on an inductor with inductance $L_{pre}$=90 pH, and a post-circuit fine-tuning capability based on an inductor with inductance $L_{post}$=0.522 nH, the resulting curve 410 shows less scattering for frequencies above 60 GHz.

As another example, scattering as a function of frequency is shown for another conventional circuit as a second dotted curve 415. By adding to such circuit a pre-circuit fine-tuning capability based on an inductor with inductance $L_{pre}$=90 pH, and a post-circuit fine-tuning capability based on an inductor with inductance $L_{post}$=0.522 nH, the resulting curve 420 shows less scattering for any frequency from 0 GHz to at least 100 GHz.

The bandwidth of a CMOS-SiPh transceiver can be a function of an inductance in a CMOS electrical drive pre-circuit, and an inductance in a termination post-circuit. To visualize such function, a surface graph can be plotted.

It is noted that the curve 420 lies to the right of the curve 415. This exhibits a significant bandwidth improvement. The solid lines 410 and 420 are realizable due to the tunable circuitry disclosed herein, whereas without the tunable circuitry these lines only illustrate the best case scenario which may not be realized by a particular device due to manufacturing limitations.

Figure 5:
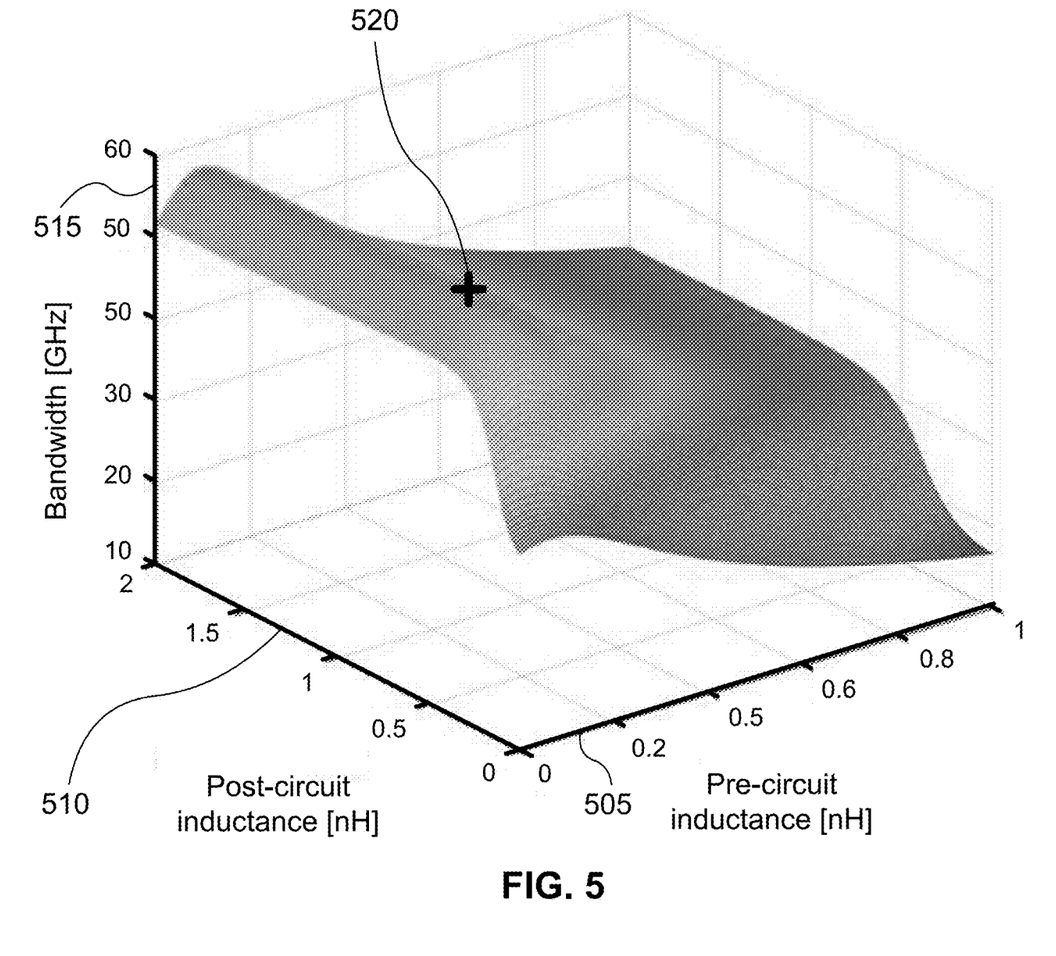
FIG. 5 is a surface graph showing bandwidth as a function of pre-circuit inductance and post-circuit inductance, of a circuit with fine-tuning capabilities, according to an embodiment.

FIG. 5 is a surface graph showing the bandwidth as a function of pre-circuit inductance and post-circuit inductance, of a CMOS-SiPh transceiver with fine-tuning capability according to an embodiment. The base circuit is an CMOS-SiPh transceiver with a bandwidth of 35 GHz. If the pre-circuit and post-circuit, according to an embodiment, have 50 Ohm impedance matching, the pre-circuit inductance can be varied 505 and the post-circuit inductance can be varied 510 as well, causing the circuit's bandwidth to vary accordingly 515. For certain values of inductances, the circuit's bandwidth can be maximized, as represented by a maximum point 520 on the surface graph. In an embodiment where $Z_s=Z_L$=50 Ohms, the bandwidth can be enhanced from 35 GHz to 56 GHz, i.e. a 60% improvement. By changing values of pre-circuit and post-circuit inductances, the bandwidth itself can be tuned.

In an embodiment, a variation in termination resistance can create a significant reduction in bandwidth. Variations in inductances of pre-circuit and post-circuit can also contribute to bandwidth variations, but with a smaller range.

In embodiments, a variable bandwidth can be achieved with variable inductors, resistors, or capacitors, any of which can be included in a CMOS platform such as CMOS-SiPh transceiver. One option for controllably adjustable inductors in a CMOS platform is illustrated in Y. Yun, et al., "Variable Inductors in CMOS for Millimeter-Wave Applications," IEEE Electron Device Letters, Vol. 33, No. 7, July 2012. As for controllably adjustable resistors, an example is found in M. Kumngern, "CMOS Tunable Positive/Negative Floating Resistor Using OTAs," 2012 Fourth International Conference on Computational Intelligence, Communication Systems and Networks.

Embodiments include a programmable CMOS platform that includes one or more inductors, resistors, and/or capacitors, having tuning ranges that are sufficient for a resulting bandwidth of the CMOS platform to have a desired range. For example, if a manufacturing process results in a x % uncertainty in bandwidth, a bandwidth tuning range of x % would be desired. Therefore, for x equal to 10 as an example, a 50-Ohm terminating resistor of a tuning circuit should be tunable over a range of 5 Ohm.

Embodiments include methods for evaluating how much tuning or adjustment should be applied to a CMOS-SiPh transceiver's bandwidth, via elements of the pre-circuit and post-circuit. Such tuning or adjustment can typically be performed during an initial self-testing or self-calibration phase, shortly after a device is turned on.

In an embodiment, a CMOS-SiPh transceiver can be equipped with hardware such as a controller, and/or software enhancements for performing self-calibration shortly after a device is turned on or during normal start operations. A controller can be configured to adjust one or more CMOS impedance circuits based on one or more measurements indicative of optical communication performance. Suitable measurements may include one or more of: bandwidth, optical modulation amplitude, error vector magnitude, bit error rate (BER), scattering parameters, or any other performance metrics that can be relevant to a self-testing or self-calibration. The bandwidth can be, for example, a 3 dB, 6 dB, 10 dB, 12 dB or 15 dB bandwidth. These impedances can be adjusted shortly after a device is turned on, and can be considered for optimizing tuning parameters. Thus, optical communication performance can be measured according to one or more of these measurements, or other similar measurements indicative of communication signal quality or efficacy. Taking such measurements can be done in a variety of ways as will be readily understood by a worker skilled in the art.

In various embodiments, the controller can be a microcontroller, application specific integrated circuit, analog controller, or other electronic device. The controller can also be used for other tasks, such as but not necessarily limited to calibration and tuning of optical components of the transceiver. Several existing or previously proposed transceiver devices include a controller configured for such purposes, and it can be advantageous to use the same controller to also perform the operations as disclosed herein. This has the benefit of achieving the tunable impedance characteristics and benefits of the present technology while limiting the amount of additional electronics hardware required.

The controller can adjust the CMOS impedance(s) based on feedback indicative of such measurements during a calibration phase, or alternatively during operation. The controller can be configured to perform adjustments iteratively or repeatedly. That is, the controller can take measurements, adjust the impedances, take further measurements, further adjust the impedances, and so on. The repeated process of taking measurements and adjusting impedances can be performed until a suitable operating condition is reached, or adjustment no longer improves performance or results in a change in measurements. The impedance adjustments can be made based on the most recent measurement or based on a plurality of past measurements. The controller can perform adjustments by transmitting suitable analog or digital electrical control signals to the CMOS impedance circuits.

Accordingly, the controller can iteratively search for an adequate operating condition of the optical communication device. This can be done by repeatedly taking measurements and adjusting the CMOS impedance circuits based on the measurements. An adequate operating condition can be a locally or globally optimal operating condition, as indicated by a local or global maximum (or minimum) value in some objective function which depends on measurements indicative of optical communication performance, for example. An adequate operating condition can be an operating condition which results in the value of the objective function surpassing a predetermined threshold level.

When a plurality of CMOS impedance circuits are present, the circuits may be adjustable individually. That is, each CMOS impedance circuit can be independently adjusted by an appropriate control signal. Additionally or alternatively, the circuits may be adjustable collectively. For example, plural CMOS impedance circuits may be adjusted by a same control signal.

In an embodiment, the BER of a CMOS-SiPh transceiver can be a target performance metric to optimize (e.g. as an objective function), however other readings can also be used. During a start-up or initial acquisition phase, a CMOS-SiPh transceiver can select, using its performance readings, whether any of the pre-compensation or post-compensation circuits should be tuned or adjusted.

Figure 6:
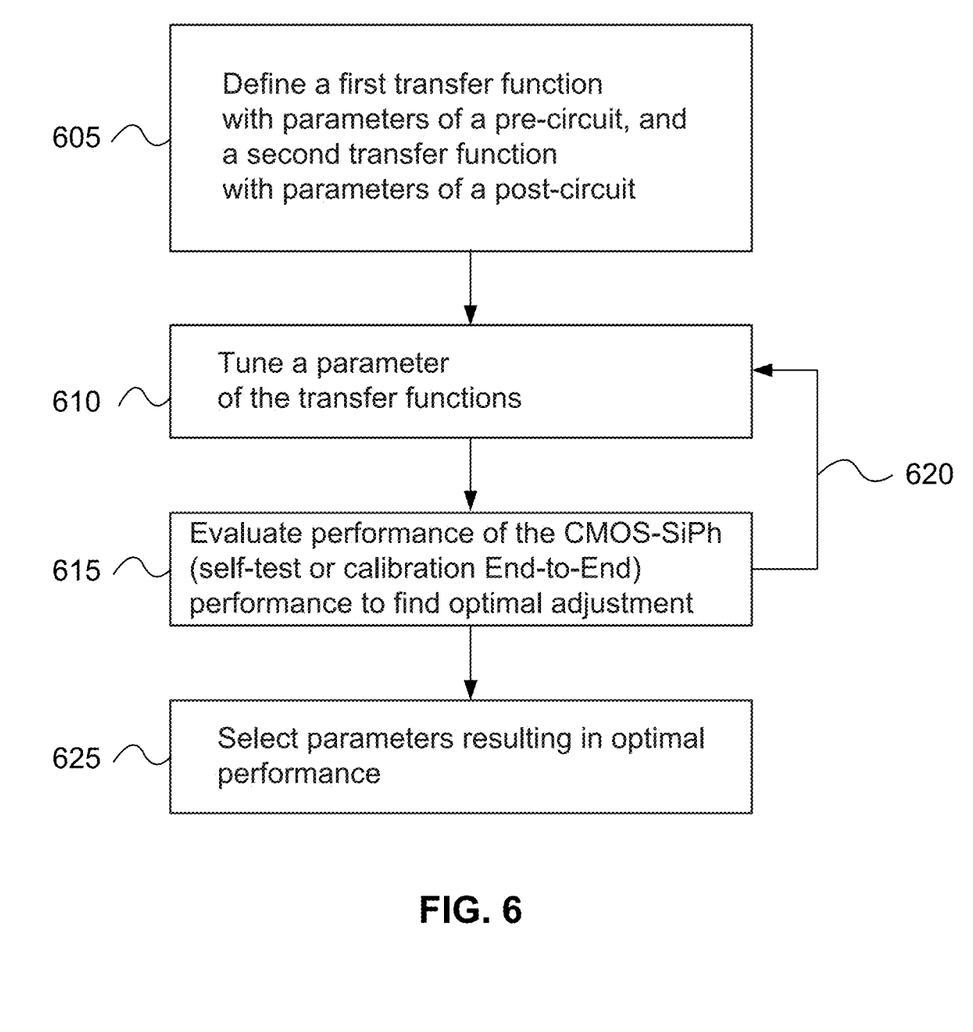
FIG. 6 is a flow chart for a method to seek an optimal operation of a CMOS-SiPh transceiver, in accordance with an embodiment.

FIG. 6 is a flow chart for a method to seek an optimal operation of a CMOS-SiPh transceiver, in accordance with an embodiment. A controller can define 605 a first transfer function with parameters of a pre-circuit, and a second transfer function with parameters of a post-circuit. If only one of the tunable pre-circuit and post-circuit are present, the controller can operate with respect to this available tunable circuit only. A first transfer function can include tunable components of a pre-circuit, and a second transfer function can include tunable components of a post-circuit. A controller can tune 610 a parameter of a transfer function and evaluate 615 the performance of the CMOS-SiPh transceiver. The controller can iterate 620 the tuning 610 and evaluating 615 for values of the first and second transfer functions a set of parameters is found to provide an optimal performance and these can be selected 625 for operation.

In embodiments, pre-transmission and post-transmission circuits, as well as transmission lines, can be jointly optimized and implemented using techniques common to CMOS with tunable (controllably adjustable) components. For example, a pre-compensation circuit can be incorporated into an optical modulator driver design in order to pre-emphasize certain parameters. Optimized termination and transmission lines of traveling wave electrodes can be considered as part of a modulator.

Depending on a target platform for monolithic or hybrid integration, a post-transmission circuit (also commonly referred as a "termination") according to embodiments can be on-chip, as part of a modulator, or off-the-chip. In some embodiments, substantially all components, such as the SiPh component, the electrical drive circuit, and the CMOS impedance circuits, are all co-located, for example integrated together in a same chip. Integration in a same single chip reduces device size and footprint, which can improve packaging capability and cost, and potentially improve performance.

Figure 7:
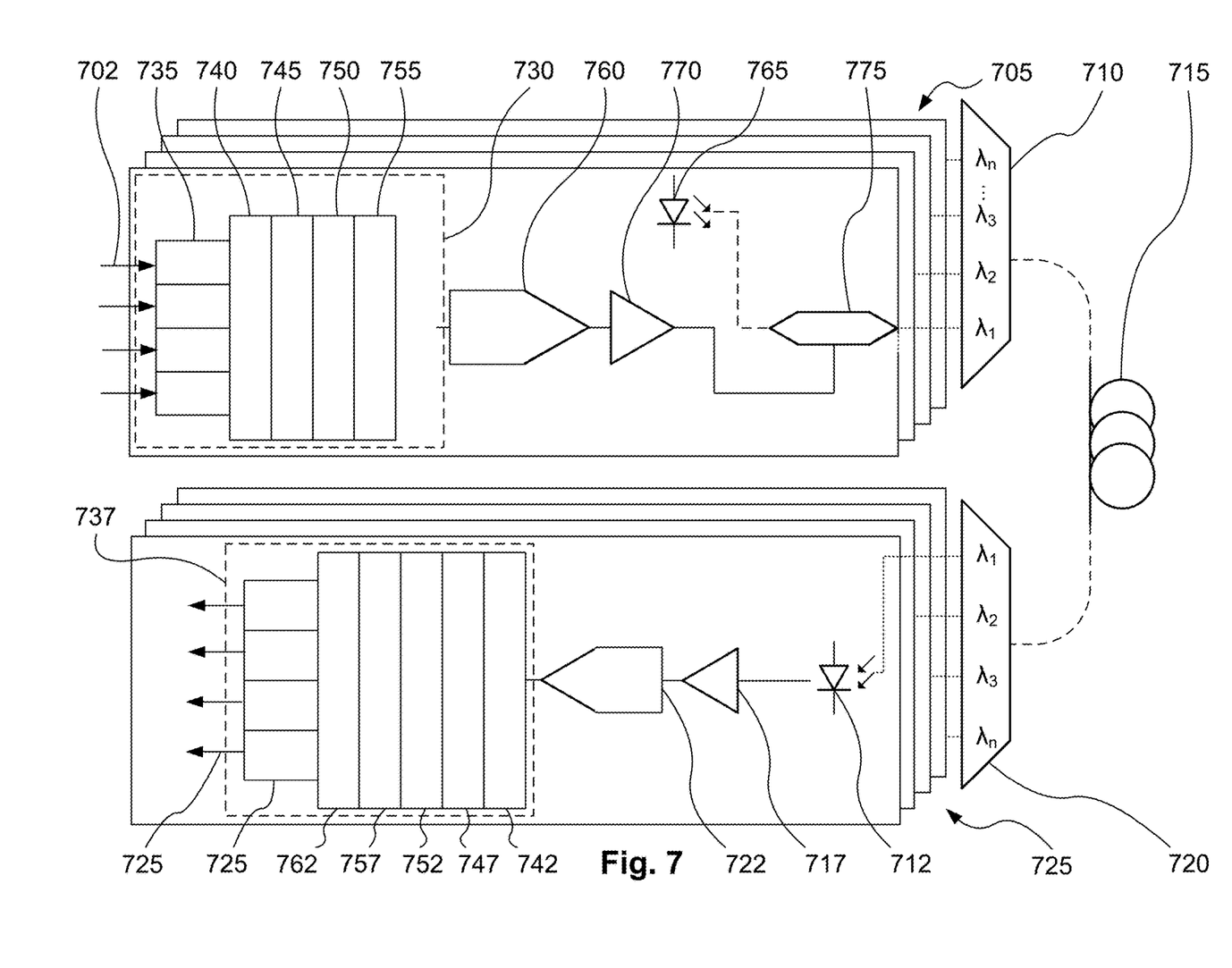
FIG. 7 illustrates an example of a short-reach optical transmission and reception chain, with digital signal-processing and error correction coding, according to an embodiment.

FIG. 7 illustrates an example of a short-reach optical transmission and reception chain, with digital signal-processing and error correction coding, according to an embodiment. One or more transmitters 705 can provide input electrical signals 702 to an optical multiplexer 710 and via an optical fiber 715, a multiplexed signal can be directed to an optical demultiplexer 720 splitting the signal according to their wavelengths into one or more receivers 725. To receive electrical signals, a transmitter 705 can include a first digital module 730 having one or more first lanes, each first lane having a clock and data recovery 730 module as an entry port. Each input signal can then be processed by a serializer 740, a forward error correction (FEC) encoder 745, a modulation format mapper 750 and a matched filter 755. Each signal can be directed to a digital-to-analog converter 760 (DAC) modulate a photodiode laser signal 765 via a modulator driver 770 and an optical modulator 775.

At a transmitter 725, signals from the de-multiplexer 720 can be received by a photodetector 712, which can direct them to a transimpedance amplifier 717 (TIA) and then an analog to digital converter 722 (ADC) that can be frequency-synchronized with the DAC 760. A signal can then be guided to a second digital module 727 containing in sequence a matched filter 742, an equalization module 747, a modulation de-mapper 752, an FEC decoder 757, and a de-serializer 762. A second clock and data recovery 730 for each second lane can send the processed signal.

Figure 8:
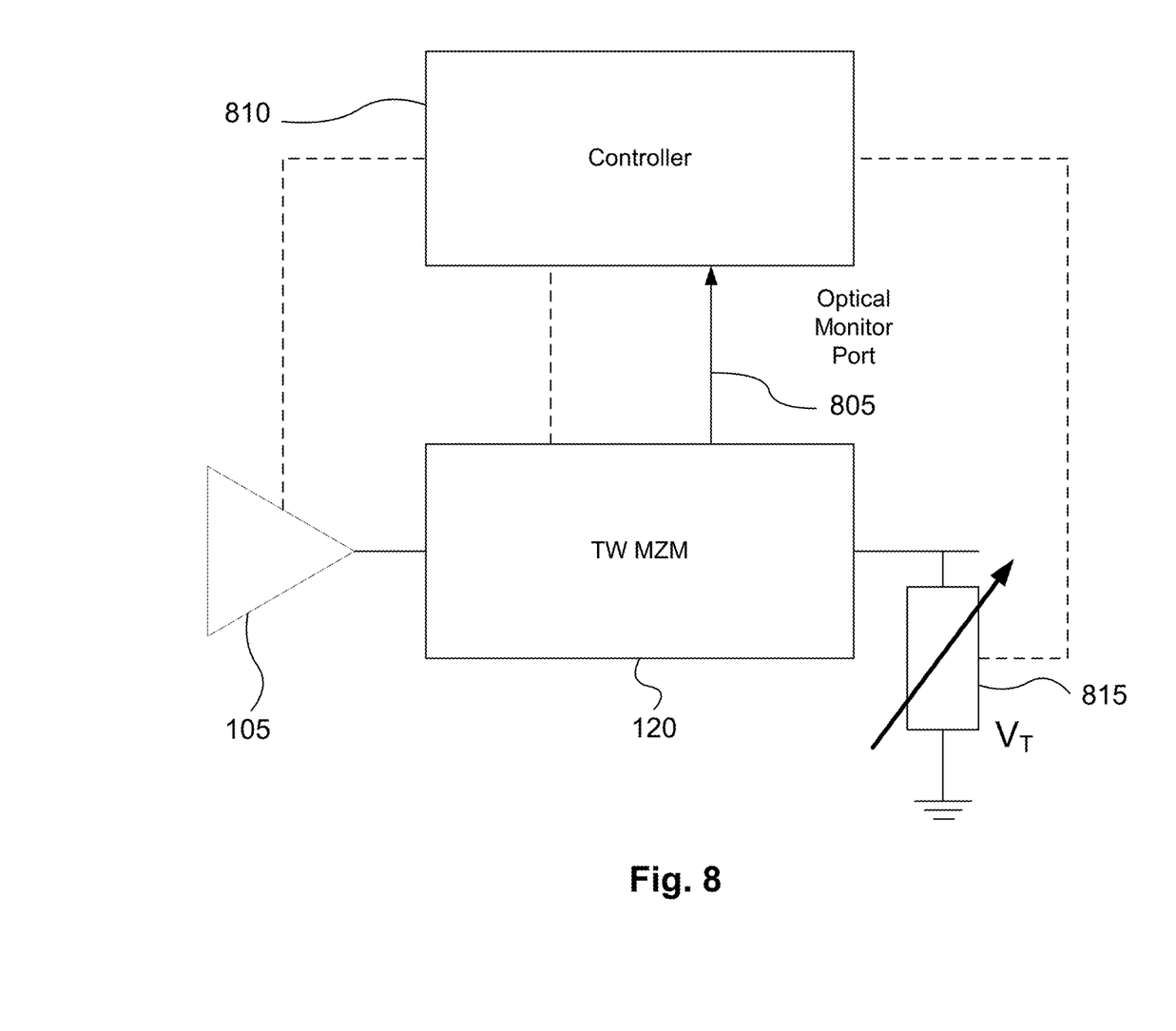
FIG. 8 illustrates a controller coupled to tunable circuits, in accordance with an embodiment.

FIG. 8 illustrates a controller coupled to tunable circuits, in accordance with an embodiment. From the transverse wave MZM 120, an optical monitor port 805 provides a connection to a controller 810. The controller is connected to CMOS electrical drive circuit 105 and to a terminal voltage source $V_T$ 815. The controller is capable of directly reading or accessing a target performance metric such as BER or Transmitter and Dispersion Eye Closure Quaternary (TDECQ). Upon powering up the device, the controller 810 can adjust any setting reflecting optimal operation. The controller 810 can also keep track of latest changes that were applied at the terminal voltage source $V_T$ 815. If an adjustment of the controller 810 to $V_T$ 815 is not producing an improved performance, the controller 810 can select a proper new setting in the right direction.

In some embodiments, the presently described technology can be used in conjunction with technology for tuning an optical modulator, for example as described in U.S. patent application Ser. No. 17/340,479, filed Jun. 7, 2021, and entitled "Optical Modulator Control System for Interconnect Transceivers," hereby incorporated by reference. In such tuning technology, a loopback circuit is used to cause output of the optical transceiver to be locally fed back to an input of the optical transceiver for self-testing. The optical transceiver can then be adjusted based on the feedback. In a similar manner, in embodiments of the present disclosure, measurements of optical communication performance can be obtained by locally monitoring of output of an optical transceiver which incorporates the SiPh component. An optical switch can be used to direct output of the optical transceiver to a photodetector, which provides output to a receive port of an optical transceiver or similar circuit. This optical transceiver can then generate an indication of optical communication performance. The CMOS impedance circuits can then be adjusted based on this indication of optical communication performance. The controller can be configured to initiate such local monitoring for example by operating an optical switch for directing output of the optical transceiver back to an input of the optical transceiver.

In some embodiments, the CMOS adjustable impedance circuits are adjusted on an as-needed basis. The CMOS adjustable impedance circuits can be adjusted when an improvement in optical communication performance is required, and not necessarily adjusted otherwise. For example, when a relatively high target communication rate (e.g. baud rate) is called for, the CMOS adjustable impedance circuits can be tuned to support this target communication rate. Otherwise, when a relatively low target communication rate is called for, the CMOS adjustable impedance circuits may not necessarily be tuned. Accordingly, enhanced communication performance can be facilitated only when required.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology. Such a computer program product may be provided for example for design purposes or for controllable adjustment of impedance circuits.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each step of the method may be executed on any computing device, such as a personal computer, server, PDA, or the like and pursuant to one or more, or a part of one or more, program elements, modules or objects generated from any programming language, such as C++, Java, or the like. In addition, each step, or a file or object or the like implementing each said step, may be executed by special purpose hardware or a circuit module designed for that purpose.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

What is claimed is:

1. An apparatus comprising:
one or more controllably adjustable complementary metal oxide semiconductor (CMOS) impedance circuits operatively coupled to
a silicon photonics (SiPh) component of an optical communication device, the optical communication device further comprising
a CMOS electrical drive circuit,
the SiPh component configured to perform an optical communication function, the electrical drive circuit operatively coupled to the SiPh device for operation thereof,
wherein the CMOS impedance circuit is configured to compensate for variation in electrical characteristics of the SiPh component.

2. The apparatus of claim 1, wherein each of the one or more CMOS impedance circuits has an impedance which is adjustable over a respective limited range, said limited range being designed and configured based at least in part on an anticipated amount of variation in electrical characteristics of the SiPh component, said variation due to manufacturing variability.

3. The apparatus of claim 1, further comprising a controller configured to adjust the one or more CMOS impedance circuits based on one or more measurements of optical communication performance.

4. The apparatus of claim 3, wherein said measurements are indicative of one or more of: bandwidth; optical modulation amplitude; error vector magnitude; and bit error rate.

5. The apparatus of claim 3, wherein the controller is configured to iteratively search for an adequate operating condition of the optical communication device by repeatedly taking said measurements and adjusting the one or more CMOS impedance circuits based on said measurements.

6. The apparatus of claim 3, wherein the controller is configured to adjust the one or more CMOS impedance circuits in response to an indication that an improved optical communication performance is required.

7. The apparatus of claim 1, wherein at least one of the one or more controllably adjustable CMOS impedance circuits is located, within an electrical circuit comprising the electrical drive circuit and the SiPh component, at one of:
a pre-compensation location in between an output of the electrical drive circuit and an electrical drive input of the SiPh component;
a termination location following the SiPh component such that the SiPh component is electrically between the electrical drive circuit and the termination location; and
an intermediate location of the SiPh component between the electrical drive input of the SiPh component and the termination location.

8. The apparatus of claim 1, wherein at least one of the one or more controllably adjustable CMOS impedance circuits is located within an optical modulator driver of the optical communication device or a CMOS portion of an optical modulator of the optical communication device.

9. The apparatus of claim 1, wherein the SiPh component, the electrical drive circuit, and the one or more CMOS impedance circuits are all integrated in a same chip.

10. The apparatus of claim 1, wherein the SiPh component is a traveling wave Mach-Zehnder interference modulator, a ring resonator based modulator, or a micro-disk based modulator.

11. An optical communication device comprising: the apparatus of claim 1; the SiPh component; and the CMOS electrical drive circuit.

12. A method comprising:
by a controller, adjusting one or more complementary metal oxide semiconductor (CMOS) impedance circuits operatively coupled to:
a silicon photonics (SiPh) component of an optical communication device, the optical communication device further comprising
a CMOS electrical drive circuit,
the SiPh component configured to perform an optical communication function, the electrical drive circuit operatively coupled to the SiPh device for operation thereof,
wherein the CMOS impedance circuit is configured to compensate for variation in electrical characteristics of the SiPh component.

13. The method of claim 12, wherein each of the one or more CMOS impedance circuits has an impedance which is adjustable over a respective limited range, said limited range being designed and configured based at least in part on an anticipated amount of variation in electrical characteristics of the SiPh component, said variation due to manufacturing variability.

14. The method of claim 12, further comprising, by the controller, adjusting the one or more CMOS impedance circuits based on one or more measurements of optical communication performance.

15. The method of claim 14, wherein said measurements are indicative of one or more of: bandwidth; optical modulation amplitude; error vector magnitude; and bit error rate.

16. The method of claim 14, further comprising, by the controller, iteratively searching for an adequate operating condition of the optical communication device by repeatedly taking said measurements and adjusting the one or more CMOS impedance circuits based on said measurements.

17. The method of claim 12, wherein at least one of the one or more controllably adjustable CMOS impedance circuits is located, within an electrical circuit comprising the electrical drive circuit and the SiPh component, at one of:
a pre-compensation location in between an output of the electrical drive circuit and an electrical drive input of the SiPh component;
a termination location following the SiPh component such that the SiPh component is electrically between the electrical drive circuit and the termination location; and
an intermediate location of the SiPh component between the electrical drive input of the SiPh component and the termination location.

18. The method of claim 12, wherein at least one of the one or more controllably adjustable CMOS impedance circuits is located within an optical modulator driver of the optical communication device or a CMOS portion of an optical modulator of the optical communication device.

19. The method of claim 12, wherein the SiPh component, the electrical drive circuit, and the one or more CMOS impedance circuits are all integrated in a same chip.

20. The method of claim 12, wherein the SiPh component is a traveling wave Mach-Zehnder interference modulator, a ring resonator based modulator, or a micro-disk based modulator.

* * * * *